(12) United States Patent
Senthamaraikannan (10) Patent No.: US 12,416,909 B2
(45) Date of Patent: Sep. 16, 2025

(54) SYSTEM AND METHOD FOR PERFORMING LAST-MILE PROCESSING AUTOMATION

(71) Applicant: JPMorgan Chase Bank, N.A., New York, NY (US)

(72) Inventor: Ganeshkumar Senthamaraikannan, Bangalore (IN)

(73) Assignee: JPMorgan Chase Bank, N.A., New York, NY (US)

( * ) Notice: Subject to any disclaimer, the term of this patent is extended or adjusted under 35 U.S.C. 154(b) by 445 days.

(21) Appl. No.: 17/967,108

(22) Filed: Oct. 17, 2022

(65) Prior Publication Data

US 2023/0123538 A1  Apr. 20, 2023

(30) Foreign Application Priority Data

Oct. 18, 2021 (IN) .............................. 202111047060

(51) Int. Cl.
*G05B 19/418* (2006.01)
(52) U.S. Cl.
CPC .................. *G05B 19/41835* (2013.01); *G05B 2219/31368* (2013.01)
(58) Field of Classification Search
None
See application file for complete search history.

(56) References Cited

U.S. PATENT DOCUMENTS

| | | | | |
|---|---|---|---|---|
| 6,999,990 | B1 * | 2/2006 | Sullivan | H04L 67/75 709/224 |
| 10,361,916 | B2 * | 7/2019 | Liu | H04L 67/1001 |
| 10,715,564 | B2 * | 7/2020 | Mohamad Abdul | H04L 63/0807 |
| 10,839,432 | B1 * | 11/2020 | Konig | G06Q 30/016 |
| 2009/0157630 | A1 * | 6/2009 | Yuan | G06F 16/951 715/810 |

(Continued)

OTHER PUBLICATIONS

Slaa, Anne. "Management of Cloud Sourced Applications." Tilburg University, Netherlands, Master's Thesis (2011). (Year: 2011).*

(Continued)

*Primary Examiner* — Carlos R Ortiz Rodriguez
(74) *Attorney, Agent, or Firm* — Greenblum & Bernstein, P.L.C.

(57) ABSTRACT

A method for enabling automation templates as a service for data processing includes: receiving a selection of an automation template among automation templates available for performing an automation request; retrieving, from a cloud system, an inputs form template corresponding to the selected automation template; receiving inputs to be inputted to the inputs form template; submitting, to the cloud system, the inputs form to trigger an automation execution based on the selected automation template and the inputs form; performing data ingestion based on input data sources specified in the inputs form and pre-defined set of rules specified in the selected automation template; executing an automation process based on a pre-defined set of calculations, transformations, and/or arrangements specified in the automation template; and pushing results of the executing based on destination information specified in the inputs form and the pre-defined set of rules specified in the automation template.

14 Claims, 7 Drawing Sheets

(56) References Cited

U.S. PATENT DOCUMENTS

2016/0012144 A1\* 1/2016 Benjamin ........... G06F 16/9577
   715/234
2017/0048285 A1\* 2/2017 Pearl ....................... G06F 16/11
2017/0048319 A1\* 2/2017 Straub ................. G06F 16/9574

OTHER PUBLICATIONS

Höfler, Tobias. Enabling realtime collaborative data-intensive Web Applications—A case study using server-side JavaScript. Diss. Technical University of Munich, 2013. (Year: 2013).\*

Khondkar, Mustafa. "Business Support System Integration: Call Detail Record Processing and Order Management Implementation." (2015). 15 (Year: 2015).\*

Klubbenes, Lars Ivar, and Marius Blindheim Fylling. Automating and simplifying the creation of virtual machines for students—An on-premises cloud. BS thesis. NTNU, 2018. (Year: 2018).\*

Ibrahim, Asmaa Abd-elrehim Selim. "A study about using a cognitive agent in replacing level 1 and 2 service desk activities." Third International Congress on Information and Communication Technology: ICICT 2018, London. Springer Singapore, 2019. (Year: 2019).\*

D'Amore, Antonio. Implementation of a serverless application. Diss. Politecnico di Torino, 2020. (Year: 2020).\*

Zeeshan, Afzaal Ahmad. "Automating everything as code." DevSecOps for. NET Core: Securing Modern Software Applications. Berkeley, CA: Apress, 2020. 109-162. (Year: 2020).\*

Mullakara, Nandan, and Arun Kumar Asokan. Robotic process automation projects: build real-world RPA solutions using UiPath and automation anywhere. Packt Publishing Ltd, 2020. (Year: 2020).\*

\* cited by examiner

SYSTEM AND METHOD FOR PERFORMING LAST-MILE PROCESSING AUTOMATION

CROSS-REFERENCE TO RELATED APPLICATION(S)

This application claims priority benefit from Indian Application No. 202111047060, filed Oct. 18, 2021, which is hereby incorporated by reference in its entirety.

TECHNICAL FIELD

This disclosure generally relates to downstream or last mile process automation and reporting, and, more particularly, to methods and apparatuses for implementing an AMF (Automated and Modernization Factory) platform that serves as a cloud based alternative to traditional custom application based individual application user tools.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Traditionally, business users have utilized various application based user tools, which may be custom made to perform a unique function, or manual processing for performing last-mile processing and reporting. Over time, however, such practice led to issues around redundancies, authorization, resiliency, scalability, performance, versioning, integration and etc. Based on the current individualistic custom user tools and manual processes, business users are consuming data from multiple sources, such as downstream applications, vendor applications and the like. Further still, traditional user tools will require upstream/downstream application and manual data retrieval/data collections from multiple user data to talk with one another. Accordingly, every application data set will have to talk with many other applications and/or system data for performing data input, data consolidation, data formatting, data structuring, data analytics and reporting operations leading to various redundancies, and inefficiencies in technology resources.

Further still, the traditional user tools may incur various difficulties with data ingestion, automation and results. For example, use cases require specific user interface for gathering user inputs from distributed teams, leading to large numbers of user tools to be created. Also, OCR (Optical Character Recognition) related use cases impedes scalability and flexibility. Specific input files, such as binary files, may not be compatible with the traditional user tool system. Also, API (Application Programming Interface) related use cases may include a situation where data can only be requested from a specific application. Web scraping related use cases may be necessary due to lack of support for certain use cases. Use cases that are not properly handled by the user tools may require manual processing.

Also, for automation and results, additional difficulties may be present. For example, uses cases may require dynamic transformations based on data ranges. For example, Python related use cases with heavy computation may not be packaged and distributed. Some use cases may require specific presentation layer, leading to difficulty in automation and reporting. In addition, specific output formats may not be supported by the current user tool system. Lastly, certain use cases may require some data to persist, which the current user tool does not support.

SUMMARY

The present disclosure, through one or more of its various aspects, embodiments, and/or specific features or sub-components, provides, among other features, various systems, servers, devices, methods, media, programs, and platforms for implementing a cloud native AMF (Automation and Modernization Factory) that serves as a cloud based alternative to traditional custom user tools for performing user profile based last-mile automations for better transparency and more efficient utilization of technical resources, but the disclosure is not limited thereto.

Additionally, AMF is a Hub to develop, Deploy, track entire Last Mile Process, Reporting and its automation. AMF facilitates, Ease of Deployment for Citizen Developers (Business users/Developers) and Tech Developers. Its loosely-coupled framework and can adopt across the existing technologies, upstream/Downstream sources/applications. This platform or Application can be leveraged across the organization as Last Mile BLACKBOX.

According to an aspect of the present disclosure, a method enabling automation templates as a service for data processing by utilizing one or more processors and one or more memories is disclosed. The method may include: receiving, at a client device, a selection of an automation template among a plurality of automation templates available for performing an automation request; retrieving, from a cloud system, an inputs form template corresponding to the selected automation template; receiving, at the client device, a plurality of inputs to be inputted to the inputs form template; submitting, at the client device and to the cloud system, the inputs form to trigger an automation execution based on the selected automation template and the inputs form; performing, at the cloud system, data ingestion based on one or more input data sources specified in the inputs form and pre-defined set of rules specified in the selected automation template; updating, at the cloud system, logs to reflect the performed data ingestion; executing, at the cloud system, an automation process based on a pre-defined set of calculations, transformations, and/or arrangements specified in the automation template; pushing, at the cloud system, results of the executing based on destination information specified in the inputs form and the pre-defined set of rules specified in the automation template; updating, at the cloud system, the logs to reflect the pushing of the results; updating, at the cloud system, a status of the automation request; sending, by the cloud system and to the client device, a notification of the pushing of the results; and updating, at the cloud system, the logs to reflect the updating of the status.

According to another aspect of the present disclosure, the plurality of automation templates available for selection corresponds to a user profile logging into the client device.

According to another aspect of the present disclosure, at least one of the automation templates includes an input form, one or more variables, one or more rules, and reference data.

According to yet another aspect of the present disclosure, the automation process includes data consolidation, data aggregation, data calculation, data publishing and reporting.

According to another aspect of the present disclosure, the cloud system includes a web tier, an API (Application Programming Interface) tier and a data tier.

According to a further aspect of the present disclosure, the web tier includes a PA (process automation) application accessible by the client device.

According to yet another aspect of the present disclosure, the API tier includes a master catalog API, a request management API, an automation template API, and an execution API.

According to a further aspect of the present disclosure, the selection of the automation template is performed via the request management API.

According to another aspect of the present disclosure, the request management API performs at least one of: creating the automation request; scheduling the automation request; associate the automation request with the selected automation template; associate the automation request with the executing; search for the automation request; check status of the automation request; and trigger creation, submission and completion notification.

According to a further aspect of the present disclosure, wherein the automation template API performs at least one of: fetch automation template inputs form attributes for the selected automation template; retrieve automation template variables for the selected automation template; retrieve automation template rules or formats attributes for the selected automation template; and CRUD (create, read, update and delete) for reference data corresponding to the selected automation template.

According to another aspect of the present disclosure, the execution API performs at least one of: trigger ingestion process; trigger automation processing including validation, transformation, calculation, and arrangement; trigger storage and/or transfer of resulting data and documents; and read or write logs.

According to an aspect of the present disclosure, a system to enable automation templates as a service for data processing is disclosed. The system includes a client device and a cloud system. The client device is configured to: receive a selection of an automation template among a plurality of automation templates available for performing an automation request; retrieve, from the cloud system, an inputs form template corresponding to the selected automation template; receive a plurality of inputs to be inputted to the inputs form template; and submit, to the cloud system, the inputs form to trigger an automation execution based on the selected automation template and the inputs form. The cloud system is configured to: perform data ingestion based on one or more input data sources specified in the inputs form and pre-defined set of rules specified in the selected automation template; update logs to reflect the performed data ingestion; execute an automation process based on a pre-defined set of calculations, transformations, and/or arrangements specified in the automation template; push results of the executing based on destination information specified in the inputs form and the pre-defined set of rules specified in the automation template; update the logs to reflect the pushing of the results; update a status of the automation request; send, to the client device, a notification of the pushing of the results; and update the logs to reflect the updating of the status.

According to a further aspect of the present disclosure, the plurality of automation templates available for selection corresponds to a user profile logging into the client device.

According to yet another aspect of the present disclosure, at least one of the automation templates includes an input form, one or more variables, one or more rules, and reference data.

According to another aspect of the present disclosure, the automation process includes data consolidation, data aggregation, data calculation, data publishing and reporting.

According to a further aspect of the present disclosure, the cloud system includes a web tier, an API tier and a data tier.

According to yet another aspect of the present disclosure, the web tier includes a PA application accessible by the client device.

According to another aspect of the present disclosure, the API tier includes a master catalog API, a request management API, an automation template API, and an execution API.

According to a further aspect of the present disclosure, the selection of the automation template is performed via the request management API.

According to yet another aspect of the present disclosure, the request management API performs at least one of: creating the automation request; scheduling the automation request; associate the automation request with the selected automation template; associate the automation request with the executing; search for the automation request; check status of the automation request; and trigger creation, submission and completion notification.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Figure 1:
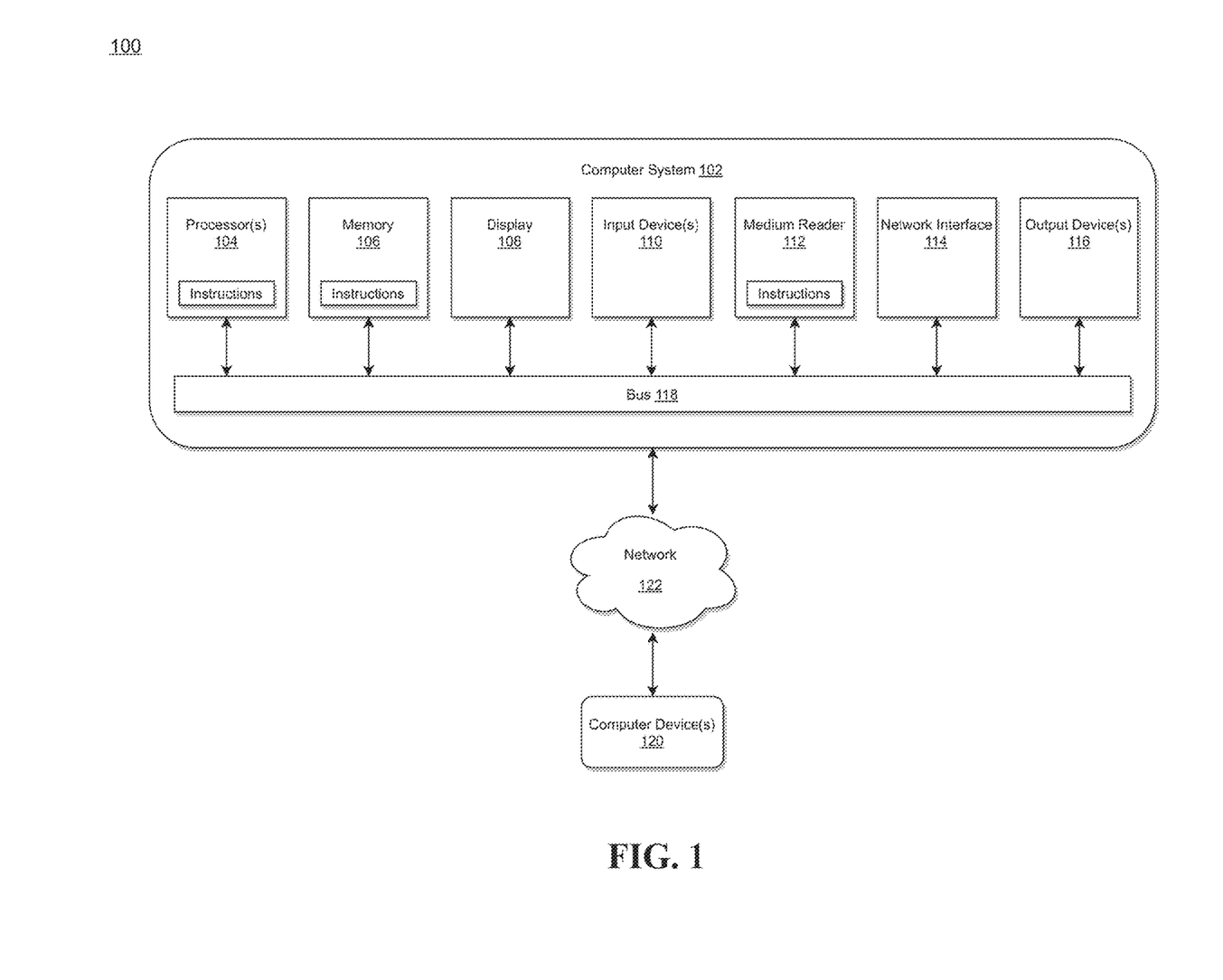
FIG. 1 illustrates a computer system for implementing a cloud native AMF (Automation and Modernization Factory) system for enabling last-mile automations for data processing in accordance with an exemplary embodiment.

FIG. 1 illustrates a computer system for implementing a cloud native automation and modernization factory (AMF) system for enabling last-mile automations for data processing in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionalities as described herein, and a processor described herein may be used to support a virtual processing environment.

Figure 2:
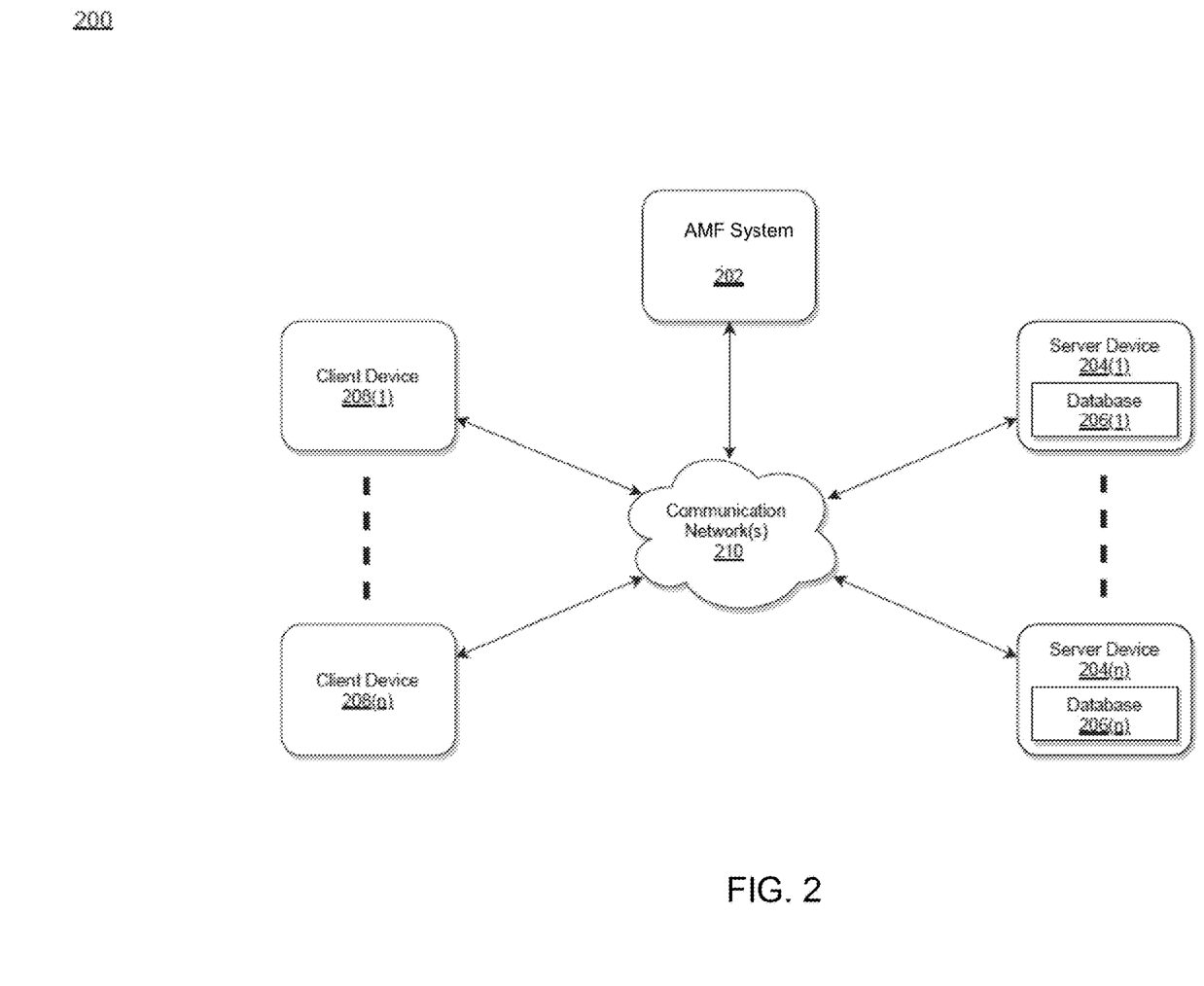
FIG. 2 illustrates an exemplary diagram of a network environment with a cloud native AMF system in accordance with an exemplary embodiment.

FIG. 2 illustrates an exemplary diagram of a network environment with a cloud native AMF system in accordance with an exemplary embodiment.

According to exemplary embodiments, the above-described problems associated with conventional approach may be overcome by implementing an AMF system 202 as illustrated in FIG. 2 that may provide a platform for implementing a cloud native AMF module(s) that serve as a cloud based alternative to traditional user tools, such as reporting user tools. The AMF system 202 provides consolidated or standard process automation tools as a service for any potential end-user without the need to learn any other advanced programming languages or concepts. Further, since the AMF system 202 standardizes may processes while allowing configuration of rules and parameters, custom automation tools are often unnecessary, which reduces memory requirements for storing of large number of customized user tools.

The AMF system 202 may be the same or similar to the computer system 102 as described with respect to FIG. 1.

The AMF system 202 may store one or more applications that can include executable instructions that, when executed by the AMF system 202, cause the AMF system 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AMF system 202 itself, may be located in virtual server(s) running in a cloud-based computing environment rather than being tied to one or more specific physical network computing devices. Also, the application(s) may be running in one or more virtual machines (VMs) executing on the AMF system 202. Additionally, in one or more embodiments of this technology, virtual machine(s) running on the AMF system 202 may be managed or supervised by a hypervisor.

In the network environment 200 of FIG. 2, the AMF system 202 is coupled to a plurality of server devices 204(1)-204(n) that hosts a plurality of databases 206(1)-206(n), and also to a plurality of client devices 208(1)-208(n) via communication network(s) 210. A communication interface of the AMF system 202, such as the network interface 114 of the computer system 102 of FIG. 1, operatively couples and communicates between the AMF system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AMF system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)) and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AMF system 202 may be a standalone device or integrated with one or more other devices or apparatuses, such as one or more of the server devices 204(1)-204(n), for example. In one particular example, the AMF system 202 may be hosted by one of the server devices 204(1)-204(n), and other arrangements are also possible. Moreover, one or more of the devices of the AMF system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AMF system 202 via the communication network(s) 210 according to the HTTP-based protocol and/or JavaScript Object Notation (JSON) protocol, for example, although other protocols may also be used. According to a further aspect of the present disclosure, wherein the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the AMF system 202 that may efficiently provide a platform for implementing a cloud native AMF module that serves as a cloud based alternative to standard process automation tools or user tools as a service for any potential end-user without the need to learn any other advanced programming languages or concepts, but the disclosure is not limited thereto.

The client devices 208(1)-208(n) may run interface applications, such as standard web browsers or standalone client applications, which may provide an interface to communicate with the AMF system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the AMF system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AMF system 202, the server devices 204(1)-204(n), or the client devices 208(1)-208(n), for example, may be configured to operate as virtual instances on the same physical machine. For example, one or more of the AMF system 202, the server devices 204(1)-204(n), or the client devices 208(1)-208(n) may operate on the same physical device rather than as separate devices communicating through communication network(s) 210. Additionally, there may be more or fewer AMF systems 202, server devices 204(1)-204(n), or client devices 208(1)-208(n) than illustrated in FIG. 2. According to exemplary embodiments, the AMF system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
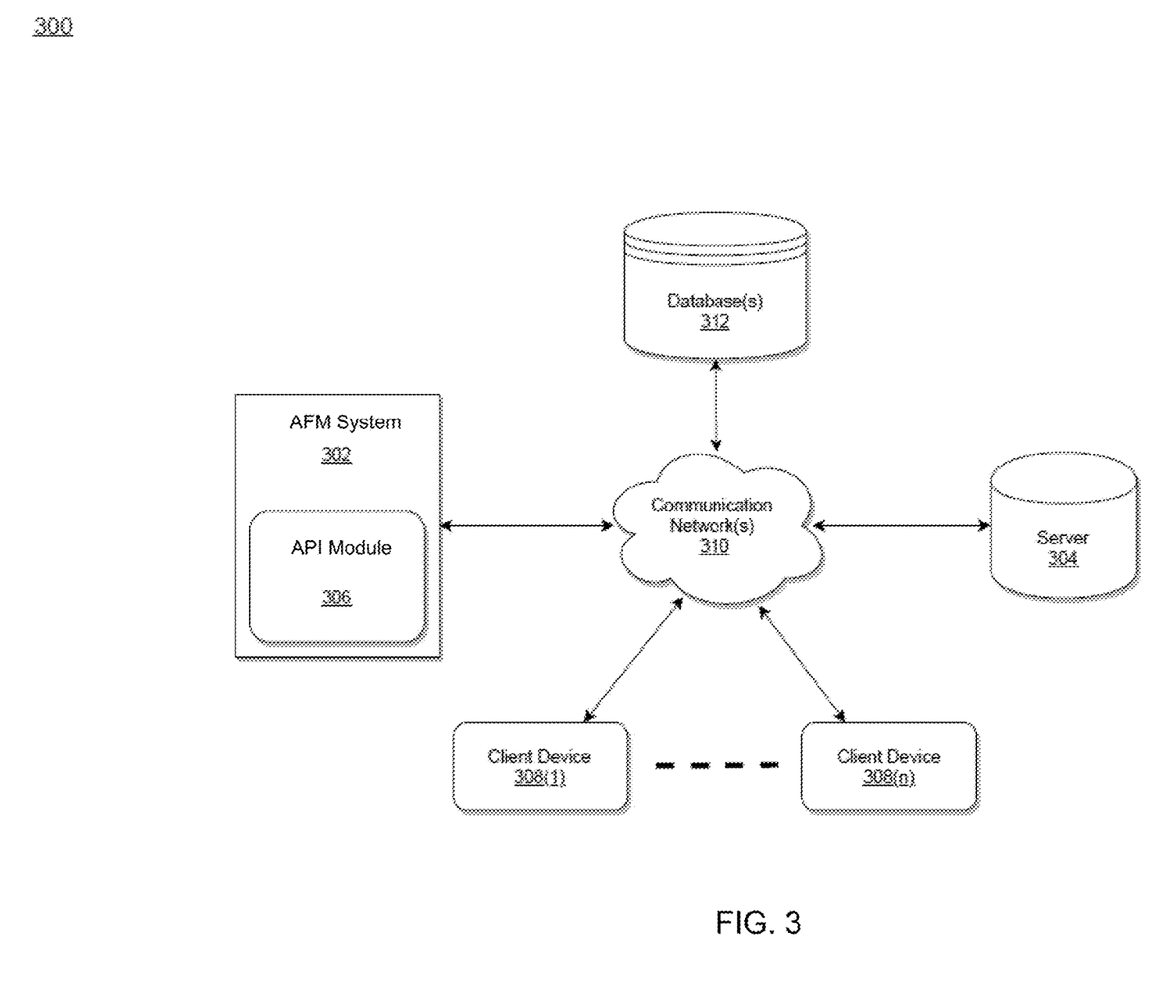
FIG. 3 illustrates a system diagram for implementing a cloud native AMF system in accordance with an exemplary embodiment.

FIG. 3 illustrates a system diagram for implementing a cloud native AMF system in accordance with an exemplary embodiment.

As illustrated in FIG. 3, the system 300 may include an AMF system 302 within which a group of API modules 306 is embedded, a server 304, a database(s) 312, a plurality of client devices 308(1) . . . 308(n), and a communication network 310.

According to exemplary embodiments, the AMF 302 including the API modules 306 may be connected to the server 304, and the database(s) 312 via the communication network 310. Although there is only one database has been illustrated, the disclosure is not limited thereto. Any number of databases may be utilized. The AMF System 302 may also be connected to the plurality of client devices 308(1) . . . 308(n) via the communication network 310, but the disclosure is not limited thereto.

According to exemplary embodiment, the AMF system 302 is described and shown in FIG. 3 as including the API modules 306, although it may include other rules, policies, modules, databases, or applications, for example. According to exemplary embodiments, the database(s) 312 may be embedded within the AMF system 302. According to exemplary embodiments, the database(s) 312 may be configured to store configuration details data corresponding to a desired data to be fetched from one or more data sources, user information data etc., but the disclosure is not limited thereto.

According to exemplary embodiments, the API modules 306 may be configured to receive real-time feed of data from the plurality of client devices 308(1) . . . 308(n) via the communication network 310.

According to exemplary embodiments, as will be described below, the API modules 306 may include, without limitation, request management API, automation template API, and execution API. The API modules 306 may provide a master catalog providing access to different APIs. In an example, upon authentication of a user, the API modules 306 may provide various automation request templates corresponding to an access setting of the user as specified in user profile.

The request management API may allow the user to create new automation requests, schedule the automation requests, association requests with existing automation templates, association requests with executions, search for automation requests, check status of an automation request, and trigger creation, submission, and completion notification.

The automation template API may fetch automation template inputs form attributes, retrieve automation template variables, retrieve automation template rules/formats attributes, CRUD (create, read, update and delete) for reference data, and the like.

The execution API may, without limitation, trigger data ingestion process, trigger automation processing (e.g., validation, transformation, calculation, and arrangement), trigger storage and/or transfer of resulting data and documents and read/write logs.

The API modules 306 may be configured to implement a user interface (UI) platform that is configured to enable AMF as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the AMF system 302. In this regard, the plurality of client devices 308(1) . . . 308(n) may be "clients" of the AMF system 302 and are described herein as such. Nevertheless, it is to be known and understood that the plurality of client devices 308(1) . . . 308(n) need not necessarily be "clients" of the AMF system 302, or any entity described in association therewith herein. Any additional or alternative relationship may exist between either or both of the plurality of client devices 308(1) . . . 308(n) and the AMF system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the AMF system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The AMF system 302 may be the same or similar to the AMF system 202 as described with respect to FIG. 2, including any features or combination of features described with respect thereto.

Figure 4:
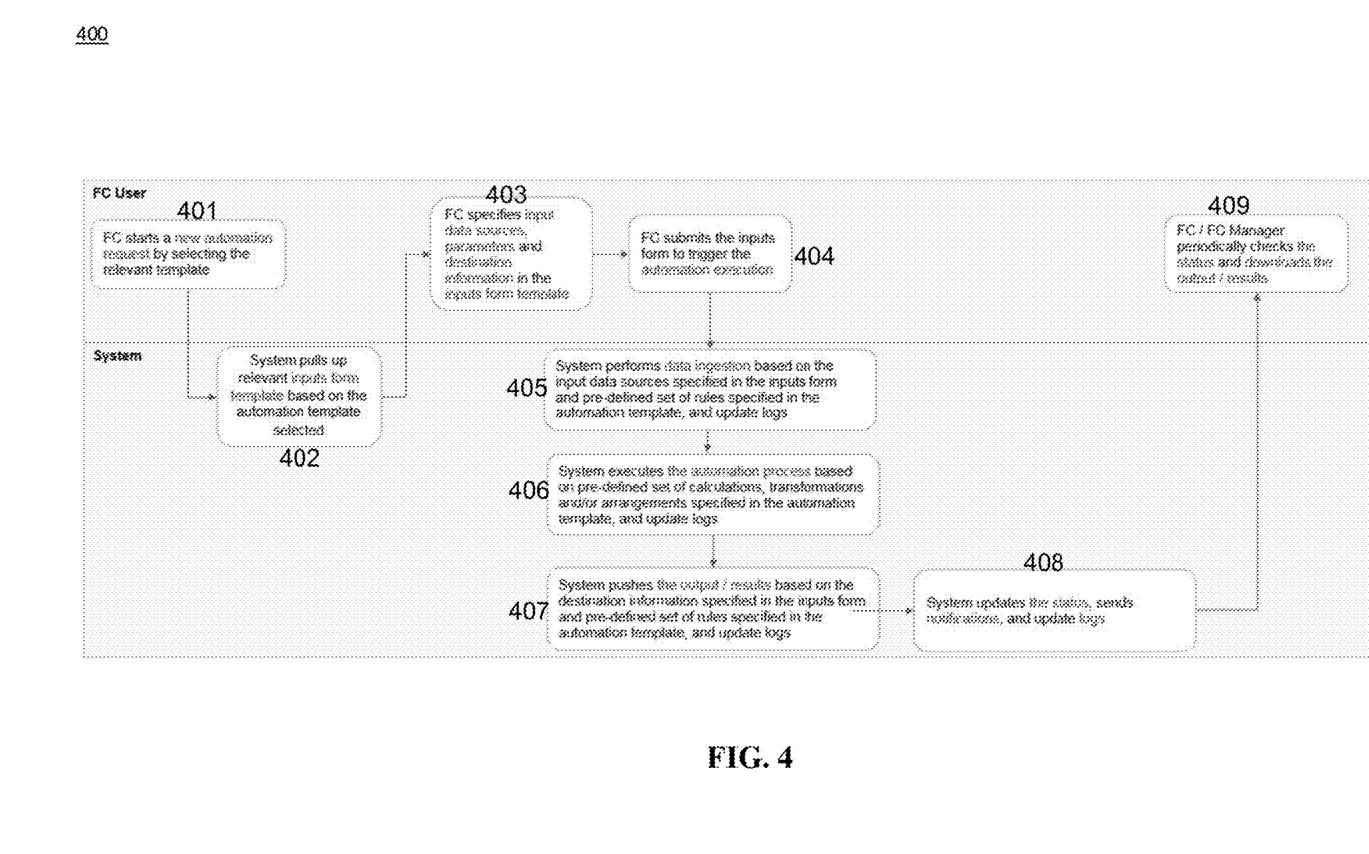
FIG. 4 illustrates an interaction diagram between a user and an AMF system in accordance with an exemplary embodiment.

FIG. 4 illustrates an interaction diagram between a user and an AMF system in accordance with an exemplary embodiment According to exemplary embodiments, a financial controller (FC) user (or any user of a client device) starts a new automation request by selecting a relevant automation template in operation 401. In an example, multiple templates may be presented to the FC user according to a user profile. Different user profile may be provided with different set of templates corresponding to attributes of the user profile, such that one user may be provided with many automation templates to select from whereas another user may be provided with only a few. Although the AMF system is described as being utilized by the FC user, aspects of the present application are not limited thereto, such that any user of a client device may utilize the system.

Upon receiving a selection of the automation template, the AMF system pulls or acquires a corresponding inputs form template in operation 402. In an example, the inputs form template may include one or more input fields to be inputted based on the selected automation template in operation 402. The input fields may include, without limitation, data sources, parameters and destination information.

In operation 403, the FC user specifies various inputs to be entered into the inputs form template of the selected automation template. The various inputs include, without limitation, data parameters, and destination information in the inputs form template.

In operation 404, the FC user submits the filled-out inputs form template of the selected automation template to trigger a corresponding process automation execution.

In operation 405, the AMF system performs a data ingestion operation based on the inputted data sources specified in the inputs form template and/or pre-defined set of rules specified in the automation template, and updates corresponding logs. In an example, data ingestion may refer to transportation of data from assorted sources to a storage medium where it can be accessed, used, and analyzed by an organization.

In operation 406, the AMF system executes the automation process based on pre-defined set of calculations, transformations, and/or arrangements specified in the automation template, and updates the corresponding logs.

In operation 407, the AMF system pushes the output/results based on the destination information specified in the filled out inputs form template and/or the pre-defined set of rules specified in the automation template, and updates the corresponding logs.

In operation 408, the AMF system updates the status, sends notifications, and updates the corresponding logs.

In operation 409, the FC user periodically checks the status of the automation request and downloads the output/results once available. However, aspects of the present disclosure are not limited thereto, such that the output/results may be automatically downloaded to a specified destination.

Figure 5:
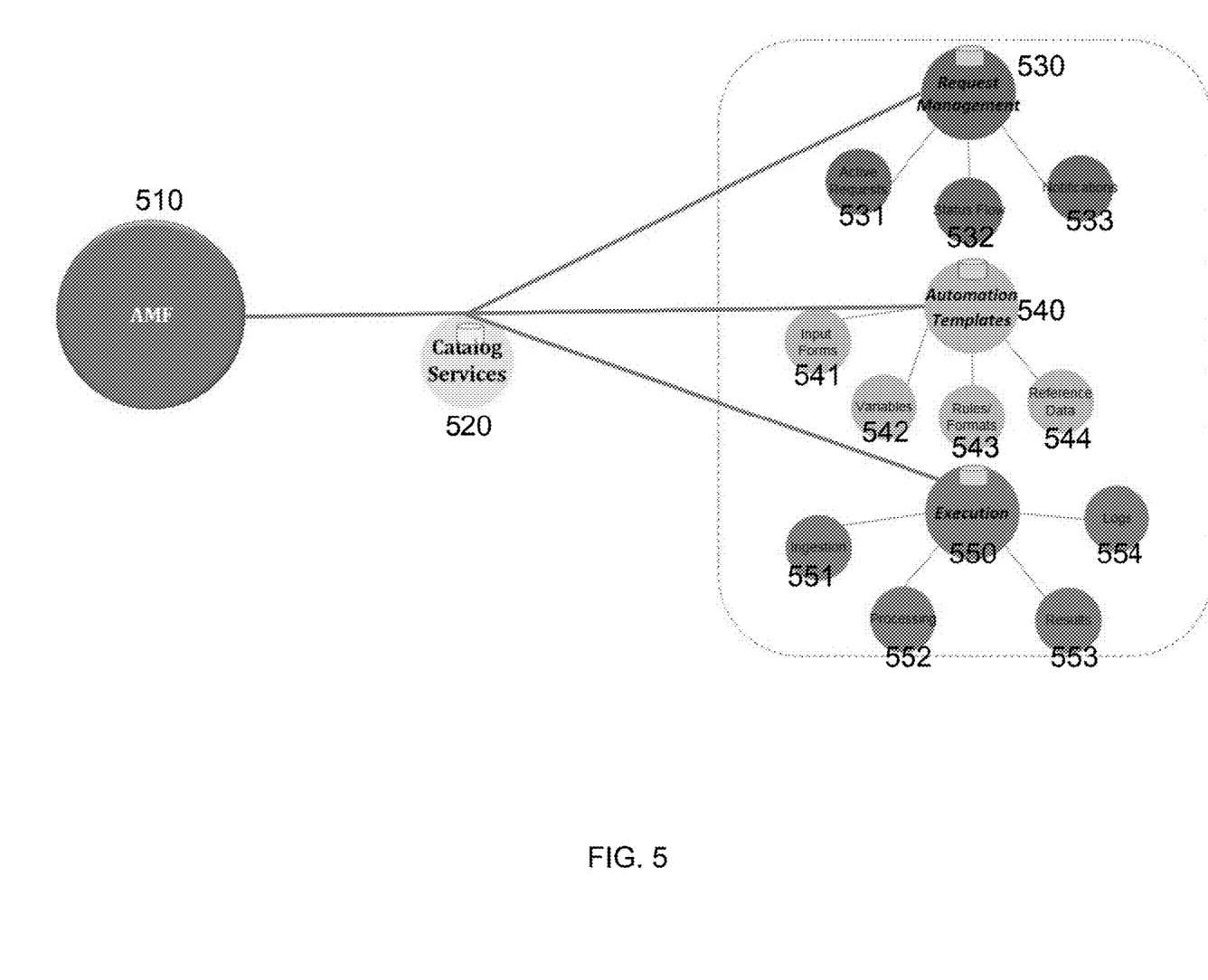
FIG. 5 illustrates an exemplary domain model with bounded contexts in accordance with an exemplary embodiment.

FIG. 5 illustrates an exemplary domain model with bounded contexts in accordance with an exemplary embodiment.

Referring to FIG. 5, according to exemplary embodiments, the AMF system 510 is connected to a catalog service 520, which provides three sets or groups of operations APIs that may be utilized. The three sets of APIs include a request management API 530, an automation templates API 540, and an execution API 550.

The request management API 530 may allow a user to, without limitation, create a new automation request, schedule a new automation request, associate requests with automation templates, associate requests with executions, search for automation request(s), check status for the automation request(s), and trigger creation, submission and completion notification.

The request management API 530 includes information corresponding to active requests 531, status flows 532, and notifications 533. The active requests 531 may include information pertaining to the requests submitted by various users that are currently being executed. The information included for the active request 531 may include, without limitation, requesting user identification, a security/access level of the user, designated data sources, a time of request, history of previous requests and the like. Further, although only the active requests 531 are illustrated, aspects of the present disclosure are not limited thereto, such as completed requests may also be provided. Completed requests may be stored for a predefined period of time prior to deletion or archiving.

The status flow 532 may indicate a status of a submitted automation request. For example, the status flow 532 may indicated estimated time of completion, position in automation queue, expected execution start time, a current status of the automation request, percentage/amount of completion, and the like.

The notification 533 may include various notification information that may be relevant to a user. The notification 533 may store and provide such information to the user on a display and/or via audio. The notification 533 may be delivered to a device specified by the user. For example, the notification may be delivered to a user's personal mobile device. The notification 533 may provide one or more notifications in the form and/or at the destination specified in the user profile or as specified by the user.

The automation templates API 540 may fetch automation template inputs form attributes, retrieve automation template variables, retrieve automation template rules/formats attributes, CRUD (create, read, update and delete) for reference data, and the like. The automation templates API 540 includes various input forms 541, variables 542, rules/formats 543, and reference data 544.

The execution API 550 includes an ingestion node 551, a processing node 552, a results node 553, and logs node 554. The execution API 550 may, without limitation, trigger a data ingestion process, trigger an automation processing (e.g., validation, transformation, calculation, and arrangement), trigger storage and/or transfer of resulting data and documents, and read/write logs.

Figure 6:
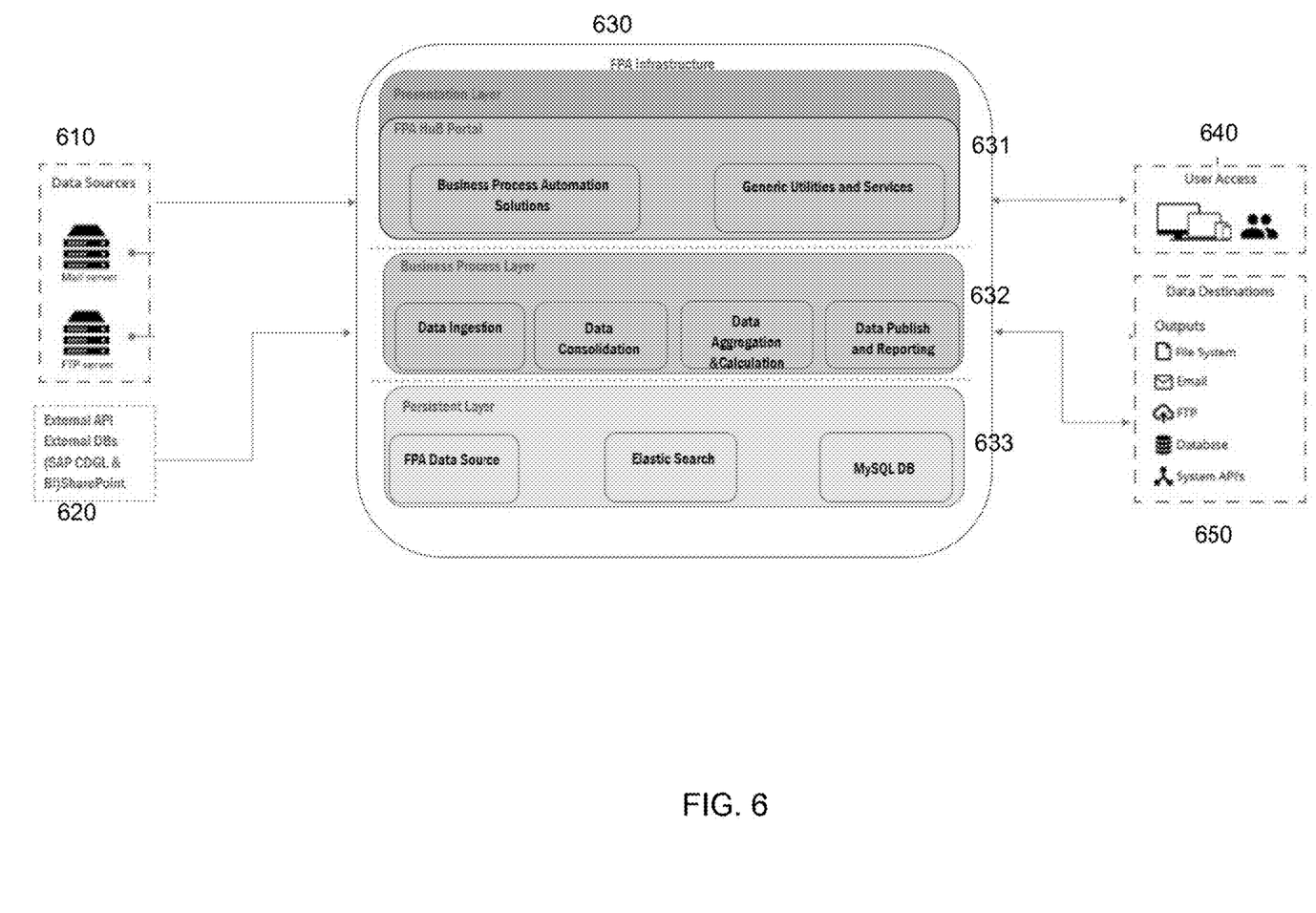
FIG. 6 illustrates an exemplary high level functional overview of a PA (process automation) hub high level function in accordance with an exemplary embodiment.

FIG. 6 illustrates an exemplary high level functional overview of a process automation (PA) hub high level function in accordance with an exemplary embodiment.

As illustrated in FIG. 6, data sources 610 and a combination of external APIs and external DBs (databases) 620 feed data to a PA (process automation) infrastructure 630.

The data sources 610 includes mail server and a file transfer protocol (FTP) server. However, aspects of the present application are not limited thereto, such that the data sources 610 may include additional servers including various sets of data. The data sources 610 may include a collection of internal servers that may be owned or controlled by an entity.

The combination of external APIs and external DBs 620, which may provide data via SharePoint. External DBs may include, without limitation, SAP, CDGL and BI (business intelligence). In an example, SAP and CDGL may exemplarily refer to finance aggregation, consolidation results supporting various statements, transactions and payments.

The PA infrastructure 630 includes three layers, namely a presentation layer 631, a business process layer 632 and a persistent layer 633. The presentation layer 631 may be a layer that is accessible to a user of the AMF system. The present layer 631 may interact with user access interface 640 via a communication network to provide display information to the user, and allow the user to provide input to the AMF system. The presentation layer 631 includes a PA Hub portal, which provides business process automation solutions as well as generic utilities and services.

In an example, the user access interface 640 may be provided on various computer devices and mobile computing devices via a communication network, such as a cloud network. The user access interface 640 may be accessed via different devices using a user login information. Same content may be provided based user profile information corresponding to the user login information to provide seamless operation across multiple devices.

The business process layer 632 performs various process and communicates with data destinations 650. The business process layer 632 may be responsible for performing, without limitation, processes associated with data ingestion, data consolidation, data aggregation and calculation, and data publishing and reporting. The data destinations 650 may include, without limitations, file system, email, FTP, database and system APIs.

In an example, data ingestion may refer to transportation of data from assorted sources to a storage medium where it can be accessed, used and analyzed by an entity. Data consolidation may exemplarily refer to corralling, combining, and storing of varied data in a single place. Such consolidation of data may allow users or systems manipulate different types of data from one point of access and helps to utilize raw data to provide better insights. Data aggregation may refer to process of gathering data and/or presenting it in a summarized format. The data gathered from multiple data sources may be combined and/or manipulated to perform calculations. Lastly, data publishing and reporting may refer to releasing of processed data in a published form for view or use by others.

Figure 7:
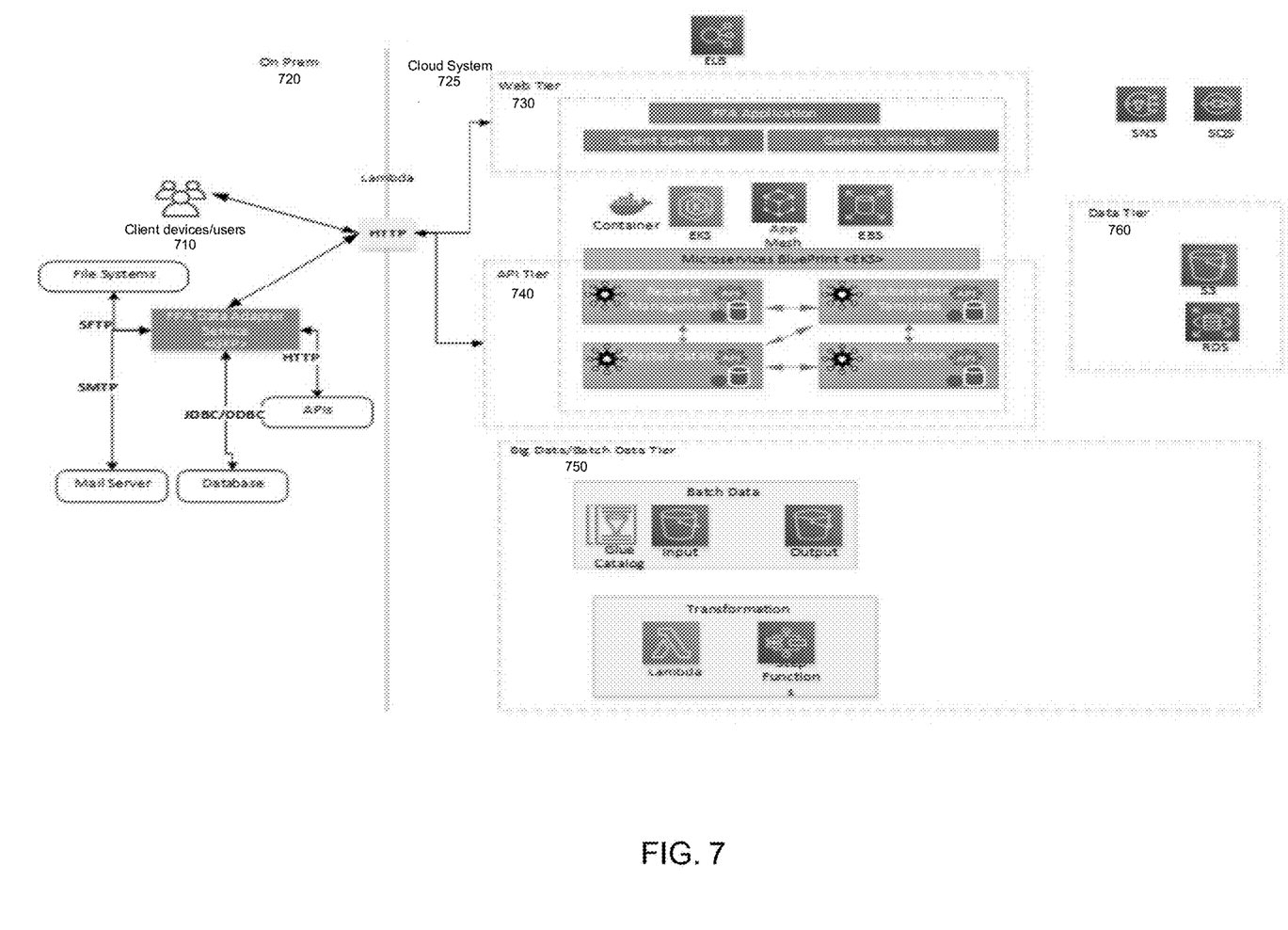
FIG. 7 illustrates an exemplary PA hub high target state architecture in accordance with an exemplary embodiment.

FIG. 7 illustrates an exemplary PA hub high target state architecture in accordance with an exemplary embodiment.

The PA hub target state architecture includes a group of client devices/users 710, and an on premise system 720. The on premise system 720 includes a set of data sources, such as file system and mail server, which provides data to a PA data adapter service. The PA data adapter service also communicates with various on premise databases and APIs. The group of client devices/users 710 and the on premise system 720 communicates with a cloud system 725 via a communication network. The cloud system 725 includes various network tiers, which includes a web tier 730, an API tier 740, a big data/batch data tier 750 and a data tier 760.

The web tier 730 includes, without limitation, a PA application, client specific UI (user interface), and generic utilities UI.

The API tier 740 includes a request management API, a master catalog API, an automation template API and an execution API. In an example, not all of the automation templates may be available to an individual user, such that automation templates accessible by a particular user may be limited in accordance with a user profile information of the particular user. Each of the request management API, the master catalog API, the automation template API and the execution API may communicate with one another.

The web tier 730 and the API tier 740 may communicate with one another via containers, EKS (Elastic Kubernetes Services), App Mesh and EBS (Elastic Block Store). The containers may exemplary refer to packages of software that contain all of the unnecessary elements to run in any environment. In this way, containers may virtualize an operating system and run anywhere. App mesh may refer to a service mesh that provides application-level networking to allow various services to communicate with each other across multiple types of computing infrastructure. In an example, EBS may provide raw block-level storage for use with elastic compute cloud (EC2) for throughput and/or transaction intensive workloads.

The big data/batch data tier 750 may include a bath data tier and a transformation tier. The big data tier includes a glue catalog, input and output. The transformation tier includes Lamda and step functions. The glue catalog may contain reference to data that is used as sources and targets of ETL (extract, transform and load) jobs. The glue data catalog is an index to the location, schema, and runtime metrics of data. The Lamda may refer to an event-driven, serverless computing platform. More specifically, the Lamda in the transformation tier may refer to a computing service that runs code in response to events and automatically manages computing resources required by that code. The step functions may refer to a low-code visual workflow services to orchestrate cloud services, automate business processes, and build serverless applications.

The data tier 760 includes S3 (simple storage service) and RDS (relational database service). S3 may refer to a service that provides object storage through a web service interface. The RDS may refer to a distributed relational database service.

Although aspects of the present application has been described with respect to an exemplary cloud configuration, aspects of the present application are not limited thereto, such that different cloud system configuration may be utilized to implement the AMF system.

Further, although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for enabling automation templates as a service for data processing by utilizing one or more processors and one or more memories, the method comprising:

presenting, at a client device of a user, a set of automation templates available for selection based on various attributes of a profile of the user, wherein differing sets of automation templates are presented to different users;

receiving, at the client device, a selection of an automation template among the set of automation templates available for performing an automation request, wherein the set of automation templates includes each of an inputs form template, a variables template, a rules/formats template, and a reference data template;

in response to the selection, retrieving, from a cloud system and via a catalog service, the inputs form template corresponding to the selected automation template, wherein the inputs form template includes data parameters and destination information corresponding to the selected automation template, wherein the catalog service provides three sets of operation application programming interfaces, including a request management application programming interface, an automation templates application programming interface, and an execution application programming interface, wherein the request management application programming interface associates automation requests with automation templates, associates the automation requests with executions, searches for the automation requests, check status for the automation requests, and trigger creation, submission and completion notification for the automation requests, wherein the request management application programming interface includes information corresponding to active automation requests, the information corresponding to the active automation requests including at least requesting user identification, a security/access level of the user, designated data sources, time of the automation requests, and history of previous automation requests, wherein the automation templates application programming interface fetches automation template inputs form attributes, retrieve automation template variables, retrieve automation template rues/formats attributes, and create, read, update and delete (CRUD) for reference data, and wherein the execution application programming interface includes an ingestion node, a processing node, a results node and logs node, triggers a data ingestion process, triggers storage and/or transfer of resulting data, triggers an automation process including validation, transformation, calculation and arrangement, and read/write logs;

receiving, at the client device, a plurality of inputs to be inputted to the inputs form template;

submitting, at the client device and to the cloud system, the inputs form to trigger an automation execution based on the selected automation template and the inputs form;

generating, at the cloud system, a status flow indicating each of an estimated time of completion of the automation execution, a position in automation queue, expected start time, a current status of the automation request, and a percentage/amount of completion;

performing, at the cloud system, data ingestion based on one or more input data sources specified in the inputs form and pre-defined set of rules specified in the selected automation template, wherein the data ingestion includes transportation of data from various data sources to a storage medium where the data can be accessed, used and analyzed;

updating, at the cloud system, logs to reflect the performed data ingestion;

executing, at the cloud system, an automation process based on a pre-defined set of calculations, transformations, and/or arrangements specified in the automation template;

pushing, at the cloud system, results of the executing based on destination information specified in the inputs form and the pre-defined set of rules specified in the automation template;

updating, at the cloud system, the logs to reflect the pushing of the results;

updating, at the cloud system, a status of the automation request;

sending, by the cloud system and to the client device, a notification of the pushing of the results; and updating, at the cloud system, the logs to reflect the updating of the status.

2. The method according to claim 1, wherein the automation process includes data consolidation, data aggregation, data calculation, data publishing and reporting.

3. The method according to claim 1, wherein the cloud system includes a web tier, an application programming interface tier and a data tier.

4. The method according to claim 3, wherein the web tier and the application programming interface tier communicate with one another via containers, Elastic Kubernetes Services (EKS), App Mesh and Elastic Block Store (EBS).

5. The method according to claim 3, wherein the web tier includes a process automation (PA) application accessible by the client device.

6. The method according to claim 5, wherein an infrastructure of the PA application includes three layers including a presentation layer, a processing layer, and a persistent layer, and wherein the presentation layer interacts with a user interface of the client device to provide access to the user.

7. The method according to claim 3, wherein the application programming interface tier includes a master catalog application programming interface, the request management application programming interface, the automation templates application programming interface, and the execution application programming interface.

8. The method according to claim 7, wherein the selection of the automation template is performed via the request management application programming interface.

9. A system to enable automation templates as a service for data processing, the system comprising:

a client device of a user; and a cloud system, wherein the client device is configured to:

present a set of automation templates available for selection based on various attributes of a profile of the user, wherein differing sets of automation templates are presented to different users;

receive a selection of an automation template among the set of automation templates available for performing an automation request, wherein the set of automation templates includes each of an inputs form template, a variables template, a rules/formats template, and a reference data template;

in response to the selection, retrieve, from the cloud system and via a catalog service, the inputs form template corresponding to the selected automation template, wherein the inputs form template includes data parameters and destination information corresponding to the selected automation template, wherein the catalog service provides three sets of operation application programming interfaces, including a request management application programming interface, an automation templates application programming interface, and an execution application programming interface, wherein the request management application programming interface associates automation requests with automation templates, associates the automation requests with executions, searches for the automation requests, check status for the automation requests, and trigger creation, submission and completion notification for the automation requests, wherein the request management application programming interface includes information corresponding to active automation requests, the information corresponding to the active automation requests including at least requesting user identification, a security/access level of the user, designated data sources, time of the automation requests, and history of previous automation requests, wherein the automation templates application programming interface fetches automation template inputs form attributes, retrieve automation template variables, retrieve automation template rues/formats attributes, and create, read, update and delete (CRUD) for reference data, and wherein the execution application programming interface includes an ingestion node, a processing node, a results node and logs node, triggers a data ingestion process, triggers storage and/or transfer of resulting data, triggers an automation process including validation, transformation, calculation and arrangement, and read/write logs;

receive a plurality of inputs to be inputted to the inputs form template; and submit, to the cloud system, the inputs form to trigger an automation execution based on the selected automation template and the inputs form, and wherein the cloud system is configured to:
generate a status flow indicating each of an estimated time of completion of the automation execution, a position in automation queue, expected start time, a current status of the automation request, and a percentage/amount of completion;
perform data ingestion based on one or more input data sources specified in the inputs form and pre-defined set of rules specified in the selected automation template, wherein the data ingestion includes transportation of data from various data sources to a storage medium where the data can be accessed, used and analyzed;
update logs to reflect the performed data ingestion;
execute an automation process based on a pre-defined set of calculations, transformations, and/or arrangements specified in the automation template;
push results of the executing based on destination information specified in the inputs form and the pre-defined set of rules specified in the automation template;
update the logs to reflect the pushing of the results;
update a status of the automation request;
send, to the client device, a notification of the pushing of the results; and
update the logs to reflect the updating of the status.

10. The system according to claim 9, wherein the automation process includes data consolidation, data aggregation, data calculation, data publishing and reporting.

11. The system according to claim 9, wherein the cloud system includes a web tier, an application programming interface tier and a data tier.

12. The system according to claim 11, wherein the web tier includes a process automation (PA) application accessible by the client device.

13. The system according to claim 11, wherein the application programming interface tier includes a master catalog application programming interface, the request management application programming interface, the automation templates application programming interface, and the execution application programming interface.

14. The system according to claim 13, wherein the selection of the automation template is performed via the request management application programming interface.

* * * * *